United States Patent [19]
Scherbarth et al.

[11] Patent Number: 5,791,760
[45] Date of Patent: Aug. 11, 1998

[54] MOTORCYCLE FRONT RUNNING LIGHT ASSEMBLY

[75] Inventors: Brian M. Scherbarth, Menomonee Falls; John E. Stelling, Fort Washington, both of Wis.; Russell L. White, Raymore, Mo.

[73] Assignee: Harley-Davidson Motor Company, Milwaukee, Wis.

[21] Appl. No.: 685,316

[22] Filed: Jul. 23, 1996

[51] Int. Cl.$^6$ .................................................. B62J 6/00
[52] U.S. Cl. ............................ 362/72; 362/83; 362/455
[58] Field of Search .............................. 362/61, 72, 83, 362/80, 307, 310, 311, 455

[56] References Cited

FOREIGN PATENT DOCUMENTS 892 721  10/1953  Germany ............................. 362/83

OTHER PUBLICATIONS

Illustration of Prior Art, Harley-Davidson Front Running Light, No Date.

*Primary Examiner*—Carroll B. Dority
*Attorney, Agent, or Firm*—Michael, Best & Friedrich, LLP

[57] ABSTRACT

A front running light assembly that is to be mounted to a front fender of a motorcycle, and including a housing having an open bottom portion leading to a cavity and a top portion having an opening. A translucent lens is positioned within the cavity and at least partially covers the opening. The lens is directly secured to the housing such that the lens maintains engagement with the housing when the housing is detached from a motorcycle front fender. The assembly further includes a base and a bulb mount for supporting a light bulb and secured to the base. The base is integrally formed with the lens, such as by molded the two parts from plastic. A resilient pad contacts the bottom portion of the housing and includes a wire opening for allowing electrical wires to pass through the pad and a bulb access opening for providing access to a light bulb supported by the bulb mount. Preferably, the pad is adhesively secured to the bottom portion of the housing. The pad includes a base and a lip extending from the base toward the housing to substantially surround the bottom portion of the housing.

13 Claims, 3 Drawing Sheets

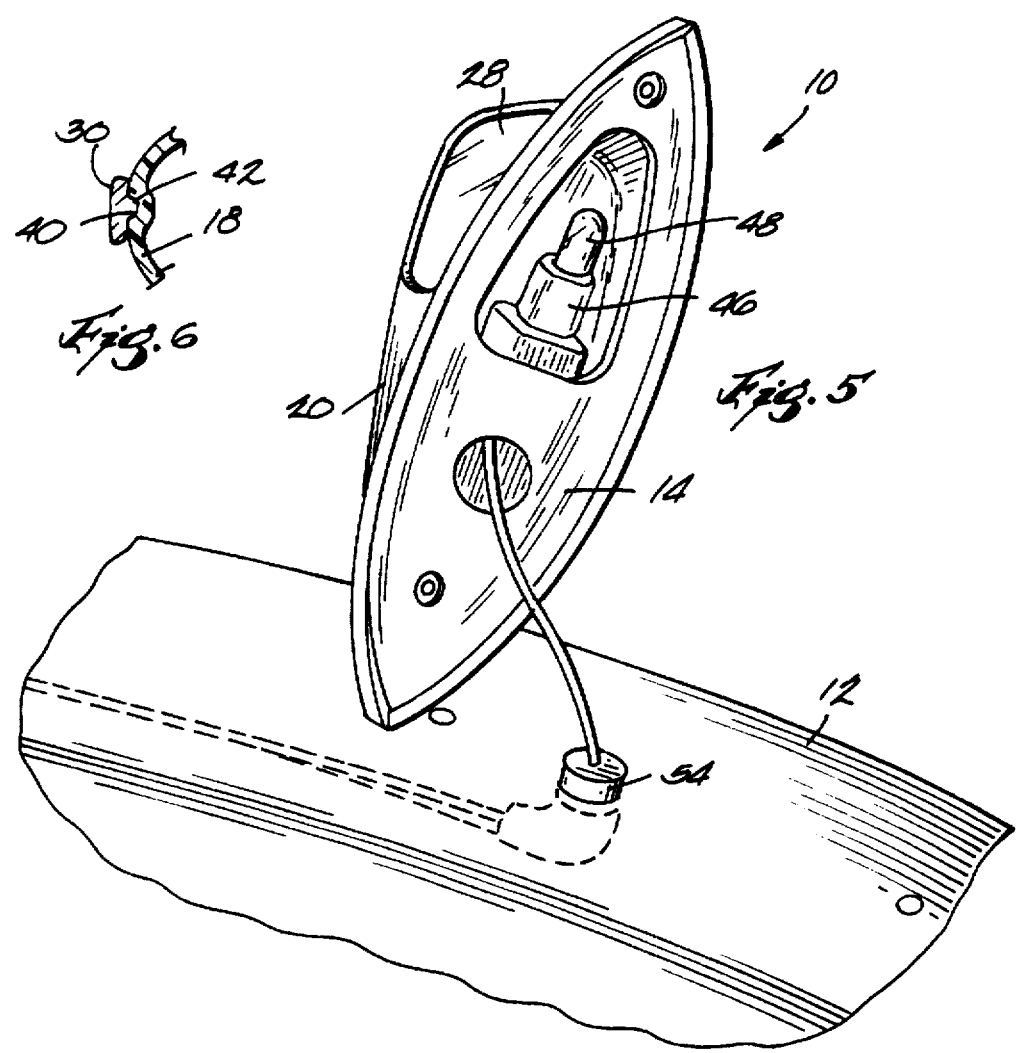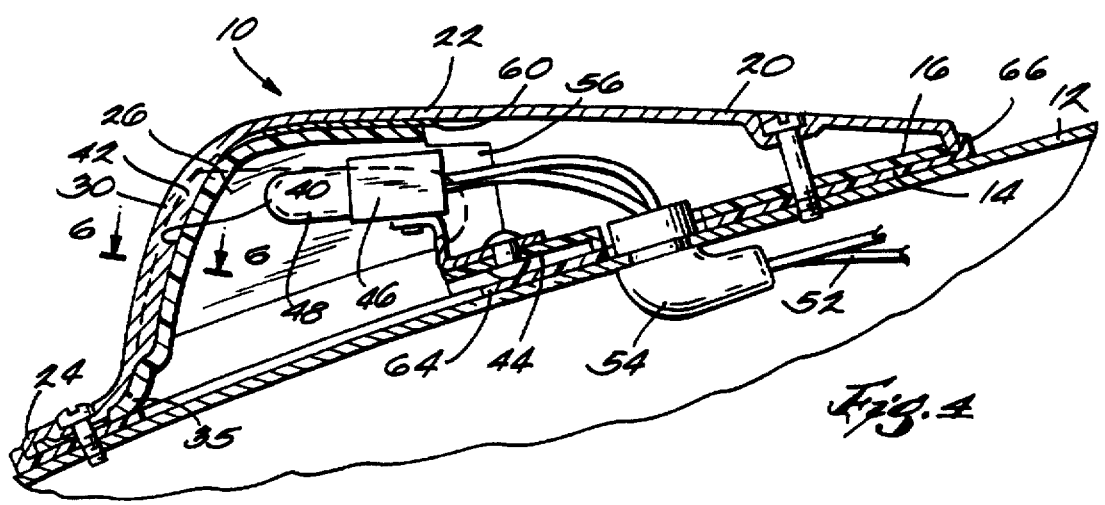

4,791,760

1

MOTORCYCLE FRONT RUNNING LIGHT ASSEMBLY

FIELD OF THE INVENTION

The present invention generally relates to the field of motorcycles, and more particularly to front running lights positioned on the front fender of some types of motorcycles.

BACKGROUND OF THE INVENTION

Motorcycles designed for road use typically include head lights on the front of the motorcycle, tail lights on the back of the motorcycle, and blinkers for obvious safety reasons and to meet government regulations. Tail lights are commonly mounted on the rear fender of motorcycles, and can include both a rear running light and a rear brake light.

In addition, some motorcycles include a front running light positioned on the front fender of the motorcycle. The front running light is designed to be illuminated when the motorcycle is running, thereby providing extra visibility to the motorcycle. Front running lights typically include a base and a cover positioned over the base. The base includes a bulb mount for receiving a light bulb and a wiring harness for providing power to the light bulb. The cover includes a metal housing having two openings, and a glass lens positioned inside the housing adjacent the two openings. The cover and base are secured to the front fender of the motorcycle using fasteners (e.g., bolts or screws) extending through the housing and threaded into the front fender. The lens is held in place by being compressed between the housing and the fender.

SUMMARY OF THE INVENTION

The present invention is directed to a new design for a front running light assembly that is to be mounted to a front fender of a motorcycle. The new design is intended to be easier to manufacture and assemble, and is designed to facilitate easy bulb replacement.

In one aspect, the front running light assembly includes a housing having an open bottom portion leading to a cavity and a top portion having an opening. A translucent lens is positioned within the cavity and at least partially covers the opening. The lens is directly secured to the housing such that the lens maintains engagement with the housing when the housing is detached from a motorcycle front fender. For example, the lens can be adhesively secured to the housing utilizing a resilient adhesive tape positioned between the lens and the housing to resiliently adhesively secure the lens to the housing.

In another aspect, the front running light assembly includes a base, a bulb mount for supporting a light bulb, a translucent lens integrally formed with the base and at least partially covering a light bulb supported by the bulb mount, and a housing positioned over the lens and having an opening aligned with the lens. Preferably, the lens and the base are integrally molded from a plastic material. The base can include an aperture for allowing electrical wires to pass through the base. In one embodiment, a front portion of the lens includes a central groove, and the housing includes a ridge positioned within the groove.

In yet another aspect, the front running light assembly includes a base, a bulb mount for supporting a light bulb, a translucent lens at least partially covering a light bulb supported by the bulb mount, a housing positioned over the lens and having an opening aligned with the lens, and a resilient pad contacting a bottom portion of the housing. The

2 pad includes a wire opening for allowing electrical wires to pass through the pad and a bulb access opening for providing access to a light bulb supported by the bulb mount. Preferably, the pad is adhesively secured to the bottom portion of the housing. In one embodiment, the pad includes a base and a lip extending from the base toward the housing to substantially surround the bottom portion of the housing.

In still another aspect, the front running light assembly includes a housing having an open bottom portion leading to a cavity and a top portion having an opening, a translucent lens positioned within the cavity and at least partially covering the opening, the lens including a rear portion having an aperture, and a bulb mount at least partially positioned within the lens and including an electrical connection extending at least partially through the aperture. In one embodiment, the assembly further includes a base for supporting the bulb mount, the base being integrally formed with the lens.

BRIEF DESCRIPTION OF THE DRAWINGS

FIG. 4 is a section view taken along line 4—4 in FIG. 2.

FIG. 5 illustrates the front running light assembly removed from the fender and inverted to provide access to the light bulb.

FIG. 6 is a section view taken along line 6—6 in FIG. 4.

DETAILED DESCRIPTION

Figure 1:
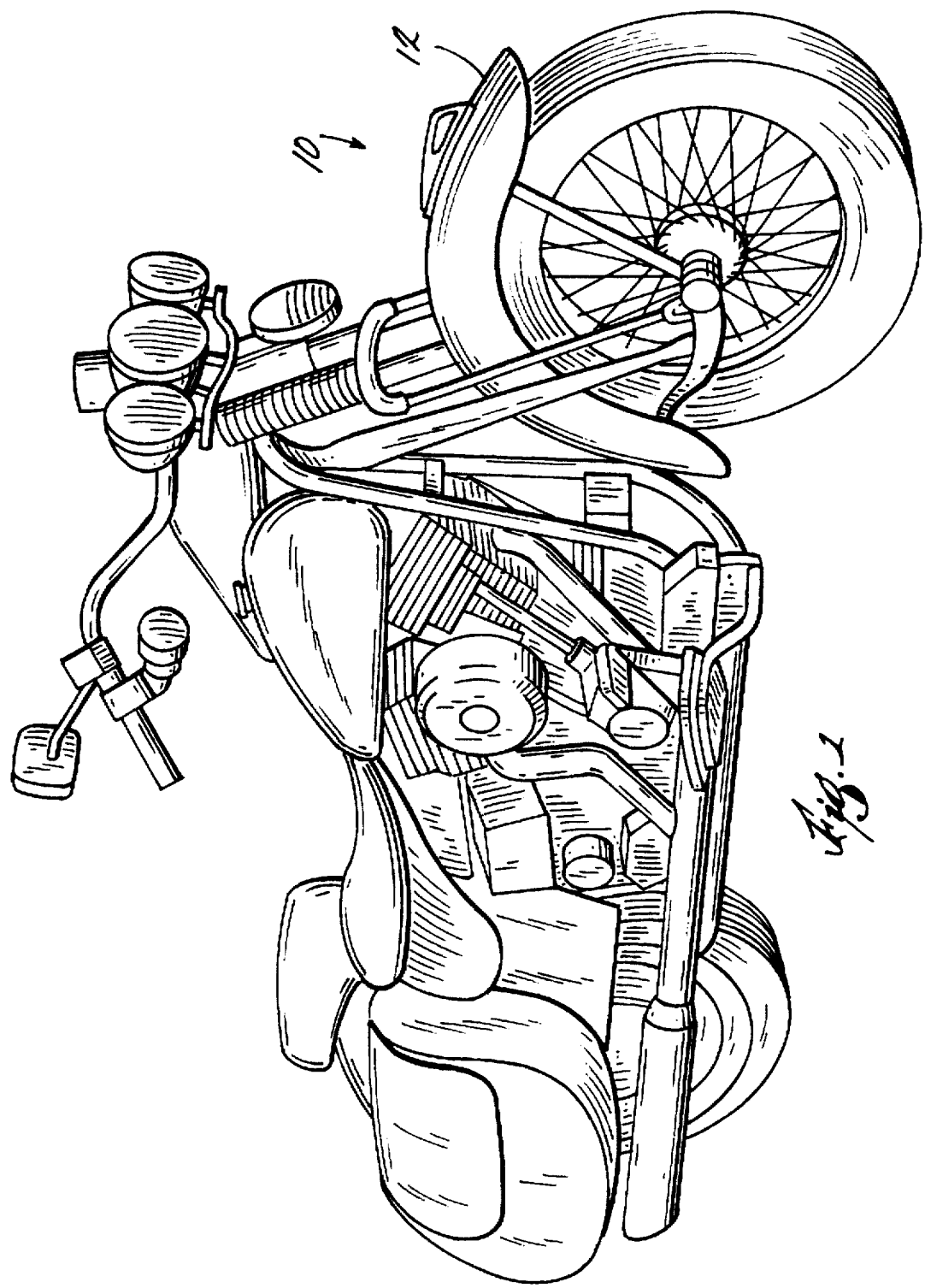
FIG. 1 is a perspective view of a motorcycle having a front running light assembly embodying the present invention.
Figure 2:
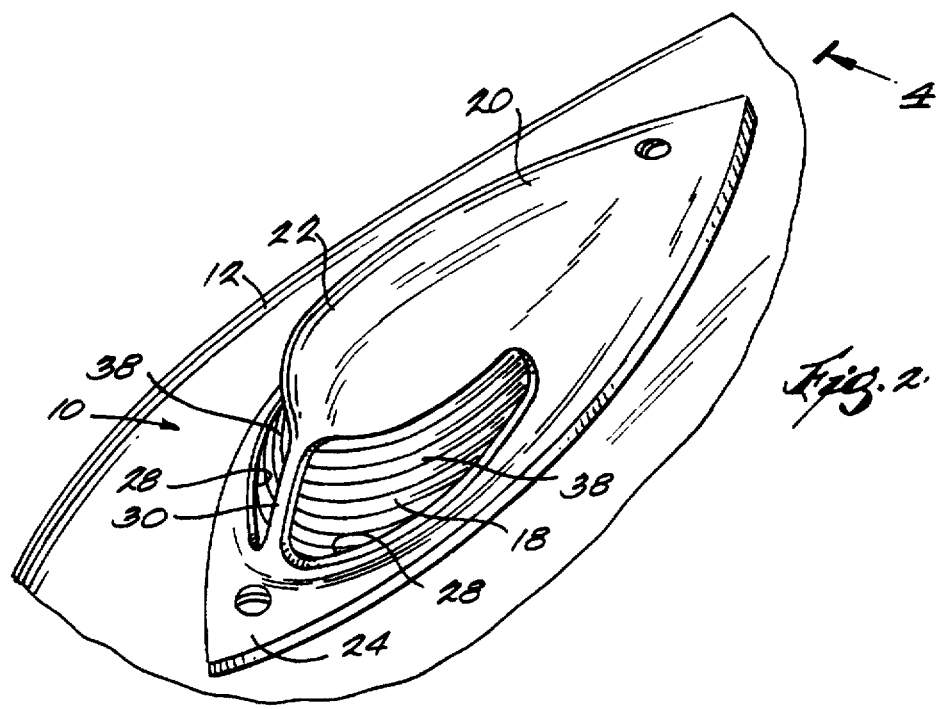
FIG. 2 is an enlarged perspective view of the front running light assembly shown in FIG. 1.
Figure 3:
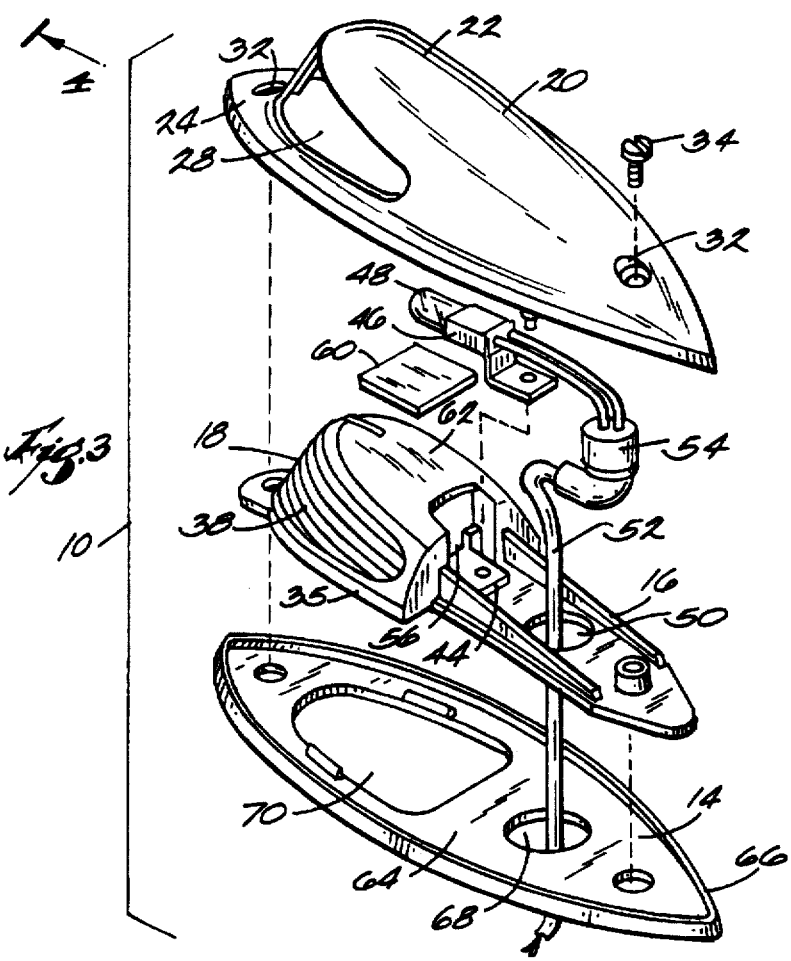
FIG. 3 is a perspective assembly view of the front running light assembly shown in FIG. 2.

FIGS. 1–4 illustrate a front running light assembly 10 for mounting on a motorcycle front fender 12. The assembly 10 generally includes a resilient pad 14, a base 16 positioned on the resilient pad 14, a translucent lens 18 positioned on the pad 14, and a housing 20 positioned over both the lens 18 and the base 16.

The housing 20 includes a top portion 22 and a bottom portion 24. The top portion 22 defines a housing cavity 26 and includes two openings 28 providing a light path from the cavity 26 and through the housing 20. A central support 30 separates the two openings 28. The bottom portion 24 is substantially open and provides access to the housing cavity 26 formed by the top portion 22. The bottom portion 24 is provided with two holes 32 that are designed to receive fasteners 34 for securing the housing 20 to the front fender 12. In the illustrated embodiment, the housing 20 is a chrome plated, zinc die-cast part.

In the illustrated embodiment, the lens 18 and the base 16 are integrally formed as a single part from a plastic material. The lens 18 is appropriately shaped to fit within the housing cavity 26. The lens 18 includes a bottom portion 35 that is open and leads to a lens cavity 26. The lens 18 includes a front portion 38 that is aligned with and partially visible through the two openings 28 when the lens 18 is properly positioned within the housing cavity 26. The lens 18 includes a central groove 40 that is dimensioned to receive a central ridge 42 secured to the central support 30 of the housing 20. The groove 40 and the ridge 42 facilitate proper alignment of the lens 18 within the housing 20.

The base 16 extends rearwardly from the lens 18, and includes a mounting pad 44 for mounting a bulb mount 46.

The bulb mount 46 is designed to support a light bulb 48 within the lens cavity 36. The base 16 further includes a wire aperture 50 for allowing electrical wires 52 to pass through the base 16. A rubber grommet 54 guides the electrical wires 52 through the front fender 12 and through the wire aperture 50 in the base 16.

The open bottom portion 35 of the lens 18 allows access to the bulb mount 46 to facilitate changing of the light bulb 48. A rear portion 56 of the lens (i.e., opposite the front portion) is also open to allow the bulb mount 46 and associated electrical wires 52 to extend through the rear portion 56 of the lens 18 and into the lens cavity 36.

The lens 18 is directly secured to the housing 20 so that the lens 18 maintains engagement with the housing 20 when the housing 20 is detached from the motorcycle front fender 12. In the illustrated embodiment, the lens 18 is adhesively secured to the housing 20 utilizing a resilient, two sided adhesive tape 60 positioned between a top portion 62 of the lens 18 and the inner surface of the top portion 22 of the housing 20. By utilizing the resilient tape 60, the lens 18 will be resiliently held between the housing 20 and the resilient pad 14 to insure a snug fit, thereby inhibiting vibrational rattles between the lens 18 and the housing 20 and further decreasing the likelihood of damage to the lens 18.

The resilient pad 14 includes a base portion 64 and a lip 66 extending upwardly from the base portion 64 toward the housing 20 to substantially surround the bottom portion 24 of the housing 20. In the illustrated embodiment, the resilient pad 14 is adhesively secured to the bottom portion 24 of the housing 20 so that the resilient pad 14 will maintain engagement with the housing 20 when the housing 20 is detached from the motorcycle front fender 12. The base portion 64 includes a wire opening 68 for allowing the electrical wires 52 to pass through the resilient pad 14 and to the bulb mount 46. The base portion 64 further includes a bulb access opening 70 positioned in alignment with the open bottom portion 35 of the lens 18. The bulb access opening 70 provides access to the light bulb 48 from the bottom of the assembly 10. More specifically, in order to change a light bulb 48 on the illustrated assembly 10, one need only remove the two fasteners 34 and turn the assembly 10 upside down (FIG. 4). Access to the light bulb 48 is immediately available without the need to separate the resilient pad 14 from any of the other components.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle front running light assembly for mounting to a motorcycle front fender, said assembly comprising:
   a housing having an open bottom portion leading to a cavity and a top portion having an opening; and
   a translucent lens positioned within said cavity and at least partially covering said opening, said lens being directly secured to said housing such that said lens maintains engagement with said housing when said housing is detached from a motorcycle front fender; and
   resilient adhesive tape positioned between said lens and said housing to resiliently adhesively secure said lens to said housing.

2. A motorcycle front running light assembly as claimed in claim 1, further comprising a base and a bulb mount for supporting a light bulb, wherein said base and said lens are integrally formed with each other such that said lens and said base maintain engagement with said housing when said housing is detached from a motorcycle front fender.

3. A motorcycle front running light assembly as claimed in claim 1, further comprising a resilient gasket surrounding said bottom portion of said housing, said gasket including a bulb access opening for providing access to a light bulb supported by said bulb mount.

4. A motorcycle front running light assembly as claimed in claim 1, wherein said lens includes a front portion aligned with said opening in said housing and a rear portion opposite said front portion, wherein said rear portion includes an aperture for allowing electrical access to said bulb mount.

5. A motorcycle front running light assembly for mounting to a motorcycle front fender, said assembly comprising:
   a base;
   a bulb mount for supporting a light bulb, said bulb mount being secured to said base;
   a translucent lens integrally formed with said base and at least partially covering a light bulb supported by said bulb mount; and
   a housing positioned over said lens and having an opening aligned with said lens.

6. A motorcycle front running light assembly as claimed in claim 5, wherein said lens and said base are molded from a plastic material.

7. A motorcycle front running light assembly as claimed in claim 5, wherein said base includes an aperture for allowing electrical wires to pass through said base.

8. A motorcycle front running light assembly as claimed in claim 5, wherein a front portion of said lens includes a central groove, and wherein said housing includes a ridge positioned within said groove.

9. A motorcycle front running light assembly for mounting to a motorcycle front fender, said assembly comprising:
   a base;
   a bulb mount for supporting a light bulb, said bulb mount being secured to said base;
   a translucent lens at least partially covering a light bulb supported by said bulb mount;
   a housing positioned over said lens and having an opening aligned with said lens; and
   a resilient pad contacting a bottom portion of said housing, said pad including a wire opening for allowing electrical wires to pass through said pad and a bulb access opening for providing access to a light bulb supported by said bulb mount.

10. A motorcycle front running light assembly as claimed in claim 9, wherein said pad is adhesively secured to said bottom portion of said housing.

11. A motorcycle front running light assembly as claimed in claim 9, wherein said pad includes a base and a lip extending from said base toward said housing to substantially surround said bottom portion of said housing.

12. A motorcycle front running light assembly for mounting to a motorcycle front fender, said assembly comprising:
- a housing having an open bottom portion leading to a cavity and a top portion having an opening;
- a translucent lens positioned within said cavity and at least partially covering said opening, said lens including a front portion aligned with said opening in said housing and a rear portion opposite said front portion, wherein said rear portion includes an aperture; and
- a bulb mount at least partially positioned within said lens and including an electrical connection extending at least partially through said aperture.

13. A motorcycle front running light assembly as claimed in claim 12, further comprising a base for supporting said bulb mount, said base being integrally formed with said lens.

* * * * *